(12) United States Patent
Liang

(10) Patent No.: US 9,847,890 B2
(45) Date of Patent: Dec. 19, 2017

(54) DATA PROCESSING DEVICE AND METHOD FOR CONTROL CHANNEL SIMPLE ESTIMATION

(71) Applicant: Huawei Technologies Co., Ltd., Shenzhen (CN)

(72) Inventor: Wei Liang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/354,653

(22) Filed: Nov. 17, 2016

(65) Prior Publication Data

US 2017/0070371 A1 Mar. 9, 2017

Related U.S. Application Data

(63) Continuation of application No. PCT/CN2015/092105, filed on Oct. 16, 2015.

(30) Foreign Application Priority Data

Apr. 22, 2015 (CN) .......................... 2015 1 0193335

(51) Int. Cl.
*H04L 25/03* (2006.01)
*H04L 5/00* (2006.01)
(Continued)

(52) U.S. Cl.
CPC ... *H04L 25/03101* (2013.01); *H04B 1/71075* (2013.01); *H04L 5/005* (2013.01);
(Continued)

(58) Field of Classification Search
CPC ......... H04L 25/02; H04L 25/03; H04L 25/08; H04L 25/0328; H04L 25/03305;
(Continued)

(56) References Cited

U.S. PATENT DOCUMENTS

| | | | | |
|---|---|---|---|---|
| 6,333,947 B1 * | 12/2001 | van Heeswyk | ...... | H04B 1/7107 375/148 |
| 2005/0195921 A1 * | 9/2005 | Abe | ..................... | H04B 1/7107 375/340 |
| 2009/0262853 A1 * | 10/2009 | Yoshida | ............... | H04B 1/7107 375/267 |

FOREIGN PATENT DOCUMENTS

| | | |
|---|---|---|
| CN | 101056302 A | 10/2007 |
| CN | 101291196 A | 10/2008 |

(Continued)

OTHER PUBLICATIONS

Machine Translation and Abstract of Chinese Publication No. CN104935536, Sep. 23, 2015, 3 pages.

(Continued)

*Primary Examiner* — Sophia Vlahos
(74) *Attorney, Agent, or Firm* — Conley Rose, P.C.

(57) ABSTRACT

A data processing device includes a control channel model simple estimation apparatus performs control channel simple estimation, which does not include filter processing, a linear prediction apparatus performs linear prediction on a result obtained by the simple estimation, a pilot reconstruction apparatus reconstructs a first estimation result obtained by the linear prediction, a control channel data regeneration apparatus regenerates a pilot part in antenna data of a control channel of the user, and a control channel interference canceller removes the regenerated pilot part from antenna data of multiple users in order to obtain a control parameter part of the antenna data of the control channels of the multiple users.

20 Claims, 7 Drawing Sheets

(51) Int. Cl.
H04B 1/7107 (2011.01)
H04L 25/02 (2006.01)
(52) U.S. Cl.
CPC ...... *H04L 25/0212* (2013.01); *H04L 25/0228* (2013.01); *H04B 2201/70701* (2013.01)
(58) Field of Classification Search
CPC . H04L 27/2691; H04B 1/7107; H04B 1/7103; H04B 1/71072; H04B 1/71075
See application file for complete search history.

(56) References Cited

FOREIGN PATENT DOCUMENTS

| | | |
|---|---|---|
| CN | 104283825 A | 1/2015 |
| CN | 104935536 A | 9/2015 |
| EP | 1954082 A1 | 8/2008 |
| EP | 2337287 A2 | 6/2011 |
| WO | 2007119207 A2 | 10/2007 |

OTHER PUBLICATIONS

Foreign Communication From a Counterpart Application, PCT Application No. PCT/CN2015/092105, English Translation of International Search Report dated Jan. 25, 2016, 2 pages.
Trivedi, A., et al., "Pilot Based Adaptive Channel Estimation and Tracking in Uplink MC-CDMA using Kalman Filter," XP031414383, Nov. 19, 2008, 6 pages.
Foreign Communication From a Counterpart Application, European Application No. 15885776.3, Extended European Search Report dated Jun. 2, 2017, 9 pages.

\* cited by examiner

DATA PROCESSING DEVICE AND METHOD FOR CONTROL CHANNEL SIMPLE ESTIMATION

CROSS-REFERENCE TO RELATED APPLICATIONS

This application is a continuation of International Application No. PCT/CN2015/092105, filed on Oct. 16, 2015, which claims priority to Chinese Patent Application No. 201510193335.4, filed on Apr. 22, 2015, both of which are hereby incorporated by reference in their entireties.

TECHNICAL FIELD

The present disclosure relates to the field of wireless communications technologies, and in particular, to a data processing device and method.

BACKGROUND

With development of wireless communications technologies, wireless devices such as a base station, a wireless intelligent device, and a wireless terminal that are in a wireless communications system need to support multi-user concurrent processing. The wireless devices may include but are not limited to, a smartphone with multiple subscriber identification module (SIM) cards, a Bluetooth® device supporting a multipoint connection, a Wireless Fidelity (WiFi) device, a radio base station, and the like.

Generally, channels in the wireless communications system are classified as a control channel used to transmit control information and a data channel used to transmit service data. The control information transmitted on the control channel generally includes a pilot and a control parameter. In an embodiment, the pilot is known to a receiver in a communication. The receiver compares a received pilot with a known pilot, to obtain a channel model of a wireless channel which is located between the receiver and a transmitter, and the receiver further performs a "channel estimation" using the channel model. Thereafter, the receiver decodes, according to a channel estimation result, service data received over the data channel to complete the communication on the data channel.

During multi-user concurrency, a modulation of different users is performed on a carrier according to a manner such as code division, time division, or frequency division. Due to reliability issues of a wireless device such as a multipath effect of space transmission by way of example, interference exists between channels of different users. Therefore, a deviation exists in the channel model obtained by the receiver during channel estimation, which causes distortion of service data received over the data channel by the receiver. A parallel interference cancellation technology may be used to cancel the interference between the channels of the different users.

A basic principle of parallel interference cancellation is as follows:

A wireless device receives a real-time signal C, where C includes modulation data of two users A and B; then the wireless device calculates a transmission model of A, and then restores a received signal A' of A according to the transmission model of A obtained by means of calculation; the wireless device subtracts A' from the real-time signal C to obtain a remained data of the user B; and finally, a transmission model of B is calculated based on the remained data of the user B.

In a process in which the wireless device subtracts A' from the real-time signal C, noise of the user A may be removed to reduce multi-user interference to the user B, where the processing is generally referred to as "antenna data cancellation". The received signal A' of A is restored according to the transmission model of A obtained by means of calculation, which is generally referred to as "antenna signal regeneration".

FIG. 1 shows a parallel interference cancellation scheme. For simple illustration, only two concurrent users are shown as a user A and a user B.

In the parallel interference cancellation scheme shown in FIG. 1, a radio signal that includes antenna data of a control channel of the user A, antenna data of a data channel of the user A, antenna data of a control channel of the user B, and antenna data of a data channel of the user B is collected by "collecting data by using an antenna". The radio signal is processed by a "control channel descrambling and despreading apparatus" to obtain baseband data of the control channel of the user A and baseband data of the control channel of the user B. Next, a "control channel model estimation apparatus" performs a channel estimation on the baseband data of the control channel of the user A and the baseband data of the control channel of the user B to obtain channel estimation results of the user A and the user B. A "control channel data regeneration apparatus" performs processing, such as spreading and scrambling opposite to the "control channel descrambling and despreading apparatus", on the obtained channel estimation results to respectively obtain regenerated antenna data of the control channel of the user A and regenerated antenna data of the control channel of the user B. Because the regenerated antenna data is corrected by a channel model, such as the "control channel model estimation apparatus", reliability of the regenerated antenna data is higher than that of original antenna data.

A "data channel interference canceller" subtracts the regenerated antenna data of the control channel from received antenna data to obtain the antenna data of the data channel of the user A and the antenna data of the data channel of the user B. The subtraction performed by the "data channel interference canceller" further cancels interference between control channels of the two users and achieves parallel interference cancellation. A "data channel descrambling and despreading demodulator" processing and a "decoding and post processing" are separately performed on antenna data output by the "data channel interference canceller" to obtain baseband data of the data channels of the two users.

Generally, the "control channel model estimation apparatus" includes a filtering process. In order to acquire a correct channel estimation result, a long filtering window is needed to collect window data for an extended period of time.

Due to an extended period of time required to obtain the channel estimation result and parallel interference cancellation cannot be started in the beginning, early interference cannot be well canceled. Consequently, as a cause-effect system, amplified interference noise occurs later in the wireless communications system that follows the law of causation.

SUMMARY

Embodiments of the present disclosure provide a data processing device and method as a solution in which parallel interference cancellation can be started early to avoid problems such as amplifying interference noise that occurs later in the "control channel model estimation apparatus" process.

According to a first aspect, an embodiment of the present disclosure provides a data processing device, including a control channel model simple estimation apparatus, a linear prediction apparatus, a pilot reconstruction apparatus, a first control channel data regeneration apparatus, and a control channel interference canceller, where the control channel model simple estimation apparatus is configured to receive baseband data of control channels of multiple users in a period n, where the baseband data includes a control parameter part and a pilot part, and n is a sequence number of the period and is a positive integer, and in the period n, for each user of the multiple users, the control channel model simple estimation apparatus is configured to perform control channel simple estimation for the user on the pilot part in the received baseband data of the control channel of the user according to the control parameter part in the received baseband data of the control channel of the user, and send a result obtained by the simple estimation to the linear prediction apparatus, where the simple estimation is estimation processing from which filtering processing is excluded. The linear prediction apparatus is configured to perform linear prediction on the received result obtained by the simple estimation for the user, and send an obtained first estimation result of the control channel of the user to the pilot reconstruction apparatus. The pilot reconstruction apparatus is configured to reconstruct the pilot part in the baseband data of the control channel of the user according to the received first estimation result of the control channel of the user, and send a reconstructed pilot part to the first control channel data regeneration apparatus. The first control channel data regeneration apparatus is configured to regenerate a pilot part in antenna data of the control channel of the user according to the received pilot part in the baseband data of the control channel of the user, and send the regenerated pilot part to the control channel interference canceller. The control channel interference canceller is configured to, in a period n+1, collect antenna data of the multiple users from an antenna, and receive, from the first control channel data regeneration apparatus, the pilot part in the antenna data of the control channels of the multiple users and regenerated by the first control channel data regeneration apparatus in the period n, and remove, from the collected antenna data of the multiple users, the received pilot part in the antenna data of the control channels of the multiple users in order to obtain a control parameter part in the antenna data of the control channels of the multiple users.

With reference to the first aspect, in a first possible implementation manner, the pilot part in the baseband data of the control channels of the multiple users and received by the control channel model simple estimation apparatus in the period n is from the pilot reconstruction apparatus, and is reconstructed by the pilot reconstruction apparatus in a period n−1.

With reference to the first aspect, in a second possible implementation manner, the pilot part in the baseband data of the control channels of the multiple users and received by the control channel model simple estimation apparatus in the period n is obtained according to antenna data of the multiple users and collected from the antenna in the period n.

With reference to the first aspect, the first possible implementation manner of the first aspect or the second possible implementation manner of the first aspect, in a third possible implementation manner, the data processing device further includes a control channel descrambling and despreading apparatus configured to, in the period n+1, receive the control parameter part in the antenna data of the control channels of the multiple users and output by the control channel interference canceller, and for each user of the multiple users, generate a control parameter part in the baseband data of the control channel of the user according to the received control parameter part in the antenna data of the control channel of the user.

With reference to the third possible implementation manner of the first aspect, in a fourth possible implementation manner, the data processing device further includes a control channel model estimation apparatus, a second control channel data regeneration apparatus, and a data channel interference canceller, wherein the period n+1, for each user of the multiple users, the control channel model estimation apparatus is configured to, receive, from the pilot reconstruction apparatus, the pilot part in the baseband data of the control channel of the user and reconstructed by the pilot reconstruction apparatus in the period n, and receive the control parameter part in the baseband data of the control channel of the user from the control channel descrambling and despreading apparatus, perform channel estimation of the control channel on the received pilot part in the baseband data of the control channel of the user according to the received control parameter part in the baseband data of the control channel of the user in order to obtain a second estimation result of the control channel of the user, and send the second estimation result to the second control channel data regeneration apparatus, wherein the channel estimation includes filtering processing. The second control channel data regeneration apparatus is configured to perform control channel data regeneration on the received second estimation result of the control channel of the user in order to obtain regenerated antenna data of the control channel of the user, and send the regenerated antenna data to the data channel interference canceller. The data channel interference canceller is configured to remove, in the period n+1 from the antenna data of the multiple users and collected from the antenna, the antenna data of the control channels of the multiple users and received from the second control channel data regeneration apparatus in order to obtain antenna data of data channels of the multiple users.

With reference to the fourth possible implementation manner of the first aspect, in a fifth possible implementation manner, the device further includes a data channel descrambling and despreading demodulator configured to, in the period n+1, receive antenna data of the data channels of the multiple users and output by the data channel interference canceller, and for each user of the multiple users, process the received antenna data of the data channel of the user according to the second estimation result of the control channel of the user and received from the control channel model estimation apparatus in order to generate baseband data of the data channel of the user.

With reference to the first aspect or any one of the first to fifth possible implementation manners of the first aspect, in a sixth possible implementation manner, the linear prediction is Kalman filtering.

With reference to the sixth possible implementation manner of the first aspect, in a seventh possible implementation manner, parameter settings of the Kalman filtering are as follows:

$x(n|n-1)=A*x(n-1|n-1);$ $P(n|n-1)=A*P(n-1|n-1)*A^t+Q;$ $K(n)=P(n|n-1)/[P(n|n-1)+R];$ $$x(n|n)=x(n|n-1)+K(n)[y(n)-x(n|n-1)]; \text{ and}$$

$$P(n|n)=[1-K(n)]*P(n|n-1),$$

where x(n|n−1) is an optimal value of a first estimation result in the period n and predicted using a first estimation result in the period n−1, x(n−1|n−1) is a first estimation result of the control channel in the period n−1, P(n|n−1) is a covariance matrix of x(n|n−1), P(n−1|n−1) is a covariance matrix of x(n−1|n−1), A is a Kalman filtering transfer coefficient, which is not less than 0 and not greater than 1, t indicates a transpose of a matrix, Q is variance estimation of y(n), K(n) is a Kalman gain, R is an antenna measurement error, y(n) is a result obtained by performing control channel simple estimation on the pilot part in the baseband data of the control channel in the period n, and x(n|n) is a first estimation result in the period n.

According to a second aspect, an embodiment of the present disclosure provides a data processing method, including receiving baseband data of control channels of multiple users in a period n, where the baseband data includes a control parameter part and a pilot part, and n is a sequence number of the period and is a positive integer; for each user of the multiple users, separately performing the following operations in the period n, performing control channel simple estimation for the user on the pilot part in the received baseband data of the control channel of the user according to the control parameter part in the received baseband data of the control channel of the user, and performing linear prediction on a result obtained by the simple estimation in order to obtain a first estimation result of the control channel of the user, where the simple estimation is estimation processing from which filtering processing is excluded, reconstructing the pilot part in the baseband data of the control channel of the user according to the obtained first estimation result of the control channel of the user, regenerating a pilot part in antenna data of the control channel of the user according to the reconstructed pilot part in the baseband data of the control channel of the user, and removing, wherein a period n+1 from the antenna data of the multiple users and collected from an antenna, the pilot part in the antenna data of the control channels of the multiple users and regenerated in the period n in order to obtain a control parameter part in the antenna data of the control channels of the multiple users.

With reference to the second aspect, in a first possible implementation manner, for each user of the multiple users, the pilot part in the baseband data of the control channel of the user and received in the period n is obtained by reconstructing the pilot part in the baseband data of the control channel of the user according to the first estimation result of the control channel of the user and obtained in a period n−1.

With reference to the second aspect, in a second possible implementation manner, for each user of the multiple users, the pilot part in the baseband data of the control channel of the user and received in the period n is obtained according to antenna data of the multiple users and collected from the antenna in the period n.

With reference to the second aspect, the first possible implementation manner of the second aspect, or the second possible implementation manner of the second aspect, in a third possible implementation manner, after the control parameter part in the antenna data of the control channels of the multiple users is obtained in the period n+1, the method further includes, in the period n+1, for each user of the multiple users, generating a control parameter part in the baseband data of the control channel of the user according to the obtained control parameter part in the antenna data of the control channel of the user.

With reference to the third possible implementation manner of the second aspect, in a fourth possible implementation manner, after the control parameter part in the antenna data of the control channels of the multiple users is obtained in the period n+1, the method further includes, in the period n+1, for each user of the multiple users, receiving the pilot part in the baseband data of the control channel of the user and reconstructed in the period n, performing, according to the control parameter part in the baseband data of the control channel of the user and generated in the period n+1, channel estimation of the control channel on the received pilot part in the baseband data of the control channel of the user and reconstructed in the period n in order to obtain a second estimation result of the control channel of the user, wherein the channel estimation includes filtering processing, performing control channel data regeneration on the obtained second estimation result of the control channel of the user in order to obtain regenerated antenna data of the control channel of the user; and removing, in the period n+1 from the antenna data that is of the multiple users and collected from the antenna, the antenna data of the control channels of the multiple users and regenerated in the period n+1 in order to obtain antenna data of data channels of the multiple users.

With reference to the fourth possible implementation manner of the second aspect, in a fifth possible implementation manner, after the antenna data of the data channels of the multiple users is obtained in the period n+1, the method further includes, in the period n+1, for each user of the multiple users, generating baseband data of the data channel of the user according to the obtained second estimation result of the control channel of the user using the obtained antenna data of the data channel of the user.

With reference to the second aspect and the first to fifth possible implementation manners of the second aspect, in a sixth possible implementation manner, the linear prediction is Kalman filtering.

With reference to the sixth possible implementation manner of the second aspect, in a seventh possible implementation manner, parameter settings of the Kalman filtering are as follows:

$$x(n|n-1)=A*x(n-1|n-1);$$

$$P(n|n-1)=A*P(n-1|n-1)*A^t+Q;$$

$$K(n)=P(n|n-1)/[P(n|n-1)+R];$$

$$x(n|n)=x(n|n-1)+K(n)[y(n)-x(n|n-1)]; \text{ and}$$

$$P(n|n)=[1-K(n)]*P(n|n-1),$$

where x(n|n−1) is an optimal value of a first estimation result in the period n and predicted using a first estimation result in the period n−1, x(n−1|n−1) is a first estimation result of the control channel in the period n−1, P(n|n−1) is a covariance matrix of x(n|n−1), P(n−1|n−1) is a covariance matrix of x(n−1|n−1), A is a Kalman filtering transfer coefficient, which is not less than 0 and not greater than 1, t indicates a transpose of a matrix, Q is variance estimation of y(n), K(n) is a Kalman gain, R is an antenna measurement error, y(n) is a result obtained by performing control channel simple estimation on the pilot part in the baseband data of the control channel in the period n, and x(n|n) is a first estimation result in the period n.

In the embodiments of the present disclosure, when channel estimation is performed on a control channel, simple estimation is performed first, and then linear prediction is performed, which replaces the channel estimation that includes the filtering process and performed by the "control channel model estimation apparatus" in FIG. 1, shortens time spent for obtaining a channel estimation result, and can start parallel interference cancellation as early as possible, thereby reducing later interference noise.

DESCRIPTION OF EMBODIMENTS

Embodiments of the present disclosure provide a data processing device and method as a solution in which parallel interference cancellation can be started early to avoid problems such as amplifying interference noise that occurs later in the "control channel model estimation apparatus" process.

Figure 1:
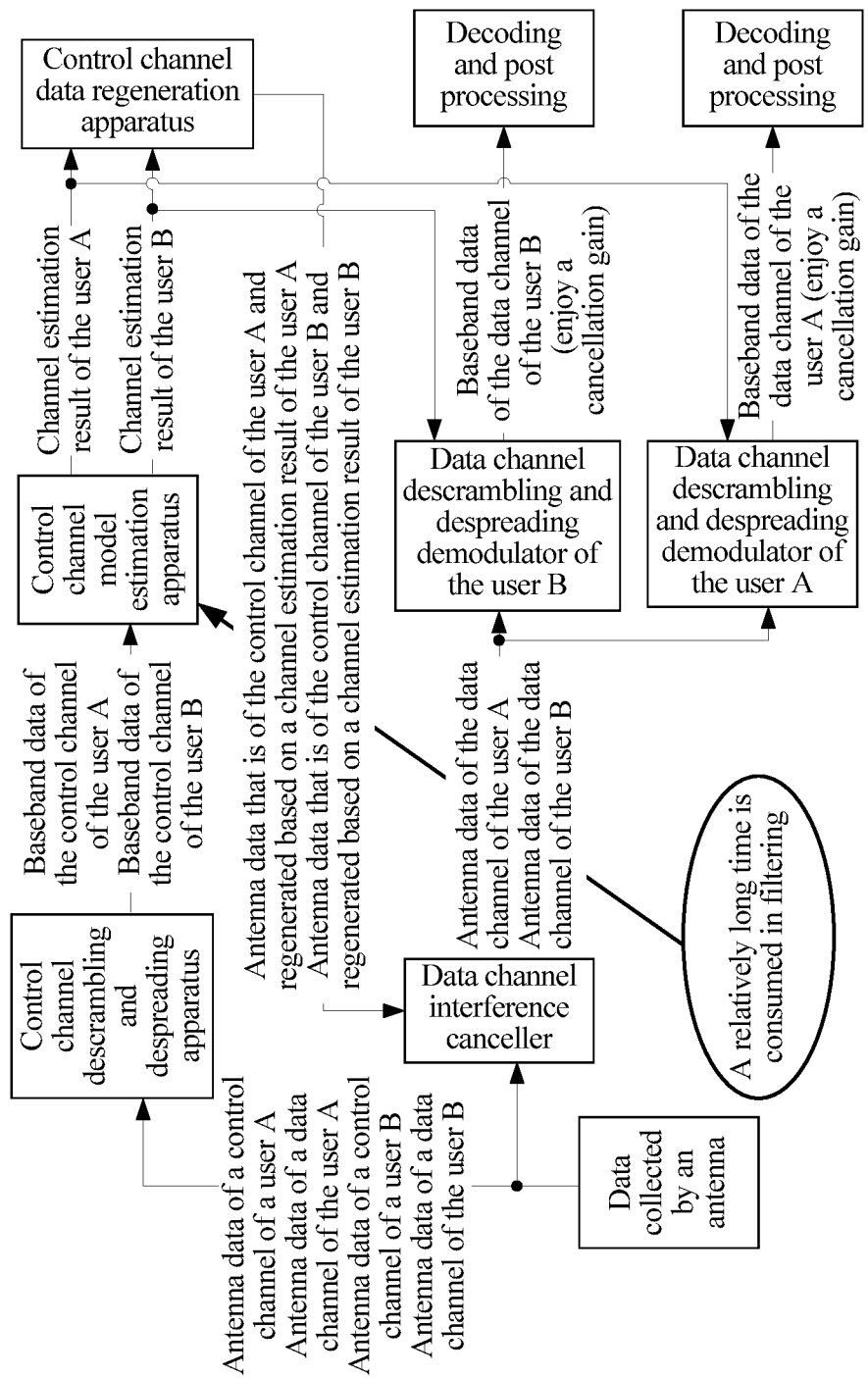
FIG. 1 is a schematic diagram of a parallel interference cancellation scheme.

In the embodiments of the present disclosure, when channel estimation is performed on a control channel, simple estimation is performed first, and then linear prediction is performed, which replaces the channel estimation that includes the filtering process and performed by the "control channel model estimation apparatus" in FIG. 1, shortens time spent for obtaining a channel estimation result, and can start parallel interference cancellation as early as possible, thereby reducing later interference noise.

The data processing device and method provided in the embodiments of the present disclosure may be applied to various devices and systems on which multi-user concurrent processing needs to be performed, for example, may be applied to the wireless devices such as the foregoing base station, a wireless intelligent device, and a wireless terminal that are in the wireless communications system.

These wireless devices may include but are not limited to a device that uses the following communications standards:

Global System for Mobile communications (GSM), Code Division Multiple Access (CDMA) IS-95, CDMA 2000, Time Division-Synchronous Code Division Multiple Access (TD-SCDMA), Wideband Code Division Multiple Access (WCDMA), Time Division Duplexing-Long Term Evolution (TDD LTE), Frequency Division Duplexing-Long Term Evolution (FDD LTE), Long Term Evolution-Advanced (LTE-advanced), a personal handy-phone system (PHS), Wireless Fidelity (WiFi) stipulated in series of 802.11 protocols, Worldwide Interoperability for Microwave Access (WiMAX), and the like.

The following describes the embodiments of the present disclosure in detail with reference to accompanying drawings.

Figure 2:
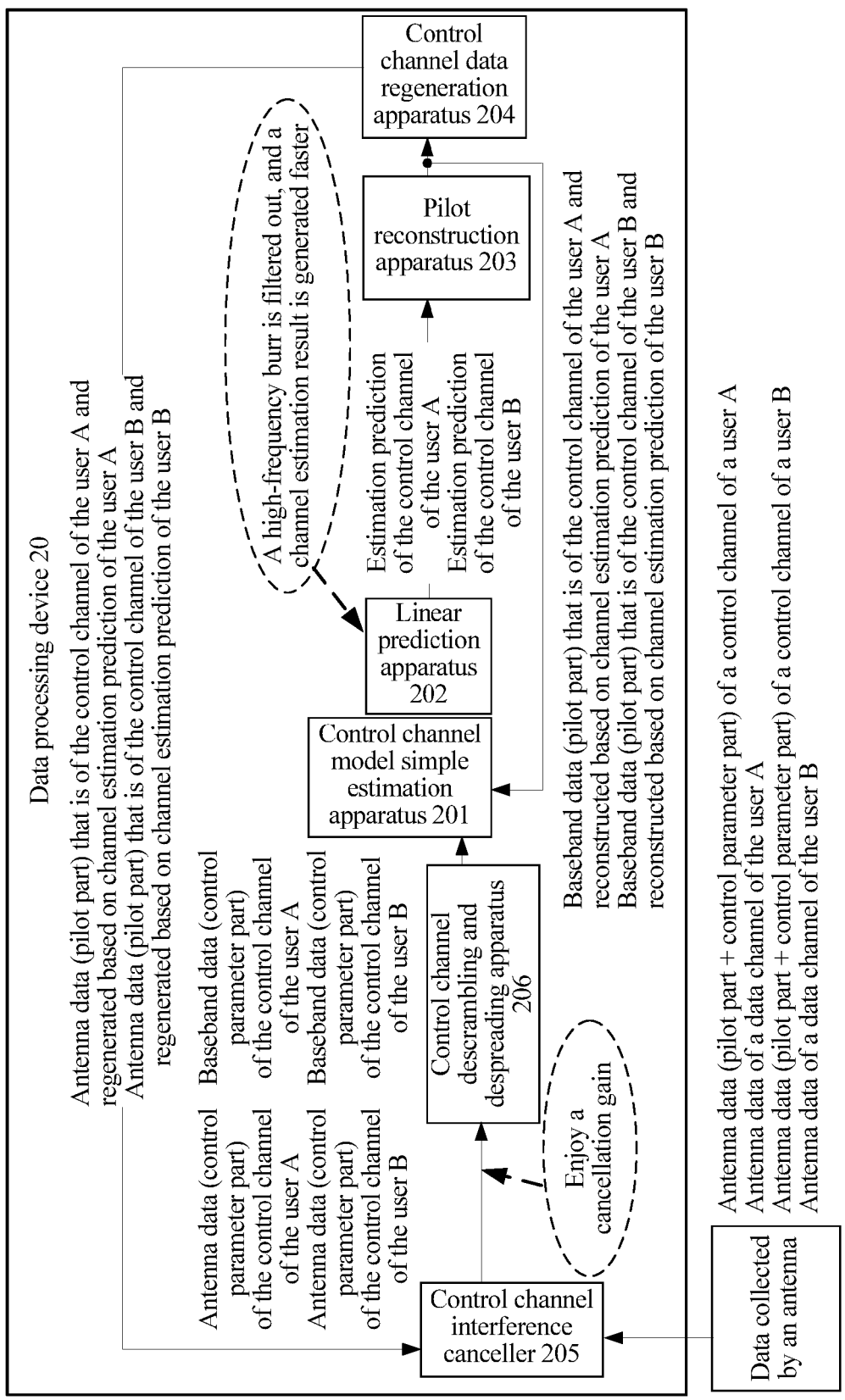
FIG. 2 is a schematic structural diagram of a first data processing device according to an embodiment of the present disclosure.

FIG. 2 is a schematic structural diagram of a data processing device 20 according to an embodiment of the present disclosure. As shown in FIG. 2, the data processing device 20 includes a control channel model simple estimation apparatus 201, a linear prediction apparatus 202, a pilot reconstruction apparatus 203, a control channel data regeneration apparatus 204, and a control channel interference canceller 205, where the control channel model simple estimation apparatus 201 is configured to receive baseband data of control channels of multiple users in a period n, where the baseband data includes a control parameter part and a pilot part, baseband data of the control channel of each user includes a control parameter part and a pilot part, and n is a sequence number of the period and is a positive integer. For each user of the multiple users, the following processing is performed in the period n:

1. The control channel model simple estimation apparatus 201 performs control channel simple estimation for the user on the pilot part in the received baseband data of the control channel of the user according to the control parameter part in the received baseband data of the control channel of the user, and sends a result obtained by the simple estimation to the linear prediction apparatus 202. The simple estimation is estimation processing from which filtering processing is excluded. Except that the filtering processing is not included, another estimation processing process is similar to the prior art, and details are not described herein again. A multipath fading signal is used as an example. In a simple estimation process of a multipath fading signal input, a channel model of a channel that transmits the multipath fading signal is determined according to amplitude, a phase, and time of arrival that are of a signal on each path in the multipath fading signal.

2. The linear prediction apparatus 202 performs linear prediction on the received result obtained by the simple estimation for the user, and sends an obtained first estimation result of the control channel of the user to the pilot reconstruction apparatus 203.

3. The pilot reconstruction apparatus 203 reconstructs the pilot part in the baseband data of the control channel of the user according to the received first estimation result of the control channel of the user, and sends a reconstructed pilot part to the control channel data regeneration apparatus 204. For a specific reconstruction process and implementation, reference may be made to descriptions in the prior art, and details are not described herein again.

4. The control channel data regeneration apparatus 204 regenerates a pilot part in antenna data of the control channel of the user according to the received pilot part in the baseband data of the control channel of the user, and sends the regenerated pilot part to the control channel interference canceller 205.

The control channel interference canceller 205 is configured to, in a period n+1, collect antenna data of the multiple users from an antenna, receive, from the control channel data regeneration apparatus 204, the pilot part in the antenna data of the control channels of the multiple users and regenerated by the control channel data regeneration apparatus 204 in the period n, and remove, from the collected antenna data of the multiple users, the received pilot part in the antenna data of the control channels of the multiple users in order to obtain a control parameter part in the antenna data of the control channels of the multiple users.

In this embodiment of the present disclosure, for data, a pilot, or a control parameter, two forms exist: antenna data and baseband data, where the antenna data is radio frequency data and the baseband data is generated after frequency demodulation is performed on the antenna data, and the baseband data can be processed by a logic circuit.

For most wireless communication users, instant moving speeds of both communication parties are less than 100 kilometers per hour (Km/h). Calculation is performed using a moving speed as 100 Km/h; a moving distance of a user is about 0.06 meter (m) per 2 milliseconds (ms). In this case, a channel environment in which the user is located may be considered as stable.

In the parallel interference cancellation scheme shown in FIG. 1, control channel model estimation includes a filtering process. To acquire a correct channel estimation result, a filtering window is generally relatively long, for example, 1 to 2 ms in order to ensure that the channel estimation result is not affected by a high-frequency burr signal. Otherwise, if a channel estimation result that carries a high-frequency burr is involved in a cancellation feedback loop, adverse impact of these high-frequency burr signals is amplified.

This means that there is a need to wait for a relatively long time to collect window data. Therefore, when the channel estimation result is finally obtained, earlier antenna data of the control channel is overdue or discarded, and data in a next period (for example, a frame) already starts to be sent in antenna collection.

In this embodiment of the present disclosure, when a data processing device 20 performs channel estimation on a control channel, simple estimation is performed first using a control channel model simple estimation apparatus 201, and then linear prediction is performed using a linear prediction apparatus 202, which replaces the channel estimation that includes the filtering process and performed by the "control channel model estimation apparatus" in FIG. 1, shortens time spent for obtaining a channel estimation result, and can start parallel interference cancellation as early as possible, thereby reducing later interference noise.

In addition, if only the simple estimation is performed, and the linear prediction is not performed, an inaccurate channel estimation result may be easily caused, and is easily affected by a high-frequency burr. Therefore, in this embodiment of the present disclosure, a linear prediction apparatus 202 is further disposed behind the control channel model simple estimation apparatus 201, where the linear prediction apparatus has relatively high accuracy, and can effectively remove impact of a high-frequency burr signal.

In the parallel interference cancellation scheme shown in FIG. 1, a gain of parallel interference cancellation can be enjoyed only by a data channel, but cannot be enjoyed by the control channel. However, in the data processing device 20 provided in this embodiment of the present disclosure, the pilot part in the antenna data of the control channel is regenerated by the control channel data regeneration apparatus 204 from the baseband data of the control channel and processed by the control channel model simple estimation apparatus 201 and the linear prediction apparatus 202, and the regenerated pilot part is fed back to the control channel interference canceller 205; the control channel interference canceller 205 removes, from the antenna data of the multiple users and collected from the antenna, the pilot part in the antenna data of the control channels of the multiple users, to obtain the control parameter part in the antenna data of the control channels of the multiple users, so that the gain of parallel interference cancellation can be enjoyed by a parameter part in the antenna data of the control channels of the multiple users.

Optionally, as shown in FIG. 2, the pilot part in the baseband data of the control channels of the multiple users and received by the control channel model simple estimation apparatus 201 from the pilot reconstruction apparatus 203 in the period n is reconstructed by the pilot reconstruction apparatus 203 in a period n−1.

Because the pilot part is obtained by means of channel estimation by the control channel model simple estimation apparatus 201 and the linear prediction apparatus 202, reliability of the pilot part is higher than that of original antenna data.

In addition, as shown in FIG. 2, the data processing device 20 may further include a control channel descrambling and despreading apparatus 206, where the apparatus receives the control parameter part in the antenna data of the control channels of the multiple users from the control channel interference canceller 205, generates a control parameter part in the baseband data of the control channels of the multiple users by means of processing such as descrambling and despreading, and sends the generated control parameter part to the control channel model simple estimation apparatus 201.

The control channel model simple estimation apparatus 201 then performs channel estimation on a reconstructed pilot part in the baseband data of the control channels of the multiple users and received from the pilot reconstruction apparatus 203. A control parameter on which the channel estimation is based enjoys the gain of interference cancellation after being processed by the control channel interference canceller 205; therefore, when the control parameter is used for channel estimation again, a channel estimation result is more accurate.

Figure 3:
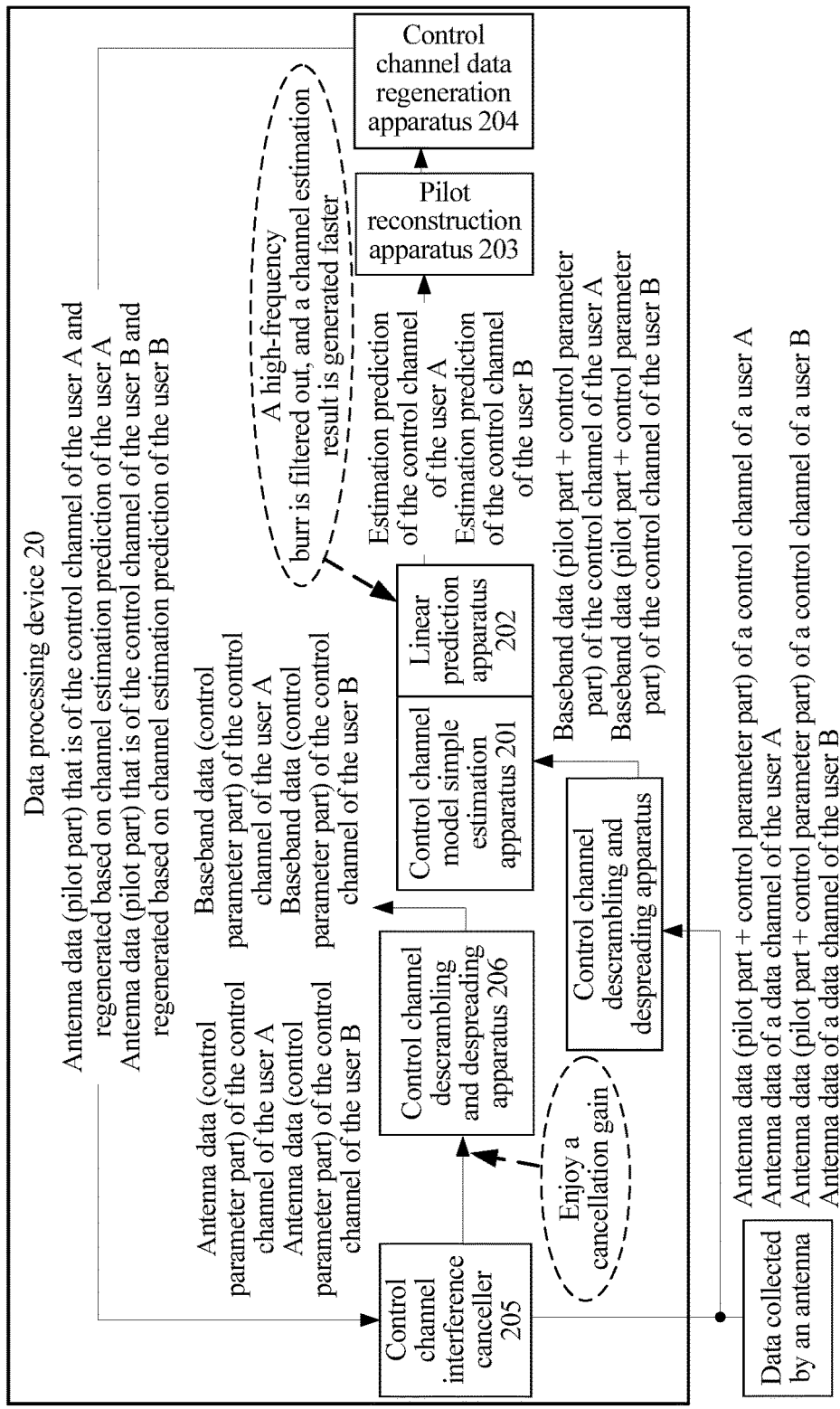
FIG. 3 is a schematic structural diagram of a second data processing device according to an embodiment of the present disclosure.

Alternatively, as shown in FIG. 3, different from FIG. 2, the baseband data of the control channels of the multiple users and input into the control channel model simple estimation apparatus 201 may also be generated by performing control channel descrambling and despreading on data collected by the antenna. In this case, the pilot reconstruction apparatus 203 does not need to feed back the pilot part in the baseband data of the control channel to the control channel model simple estimation apparatus 201, and implementation is easier.

Therefore, the pilot part in the baseband data of the control channels of the multiple users and received by the control channel model simple estimation apparatus 201 in the period n may also be obtained according to antenna data of the multiple users and collected from the antenna in the period n.

Figure 4A:
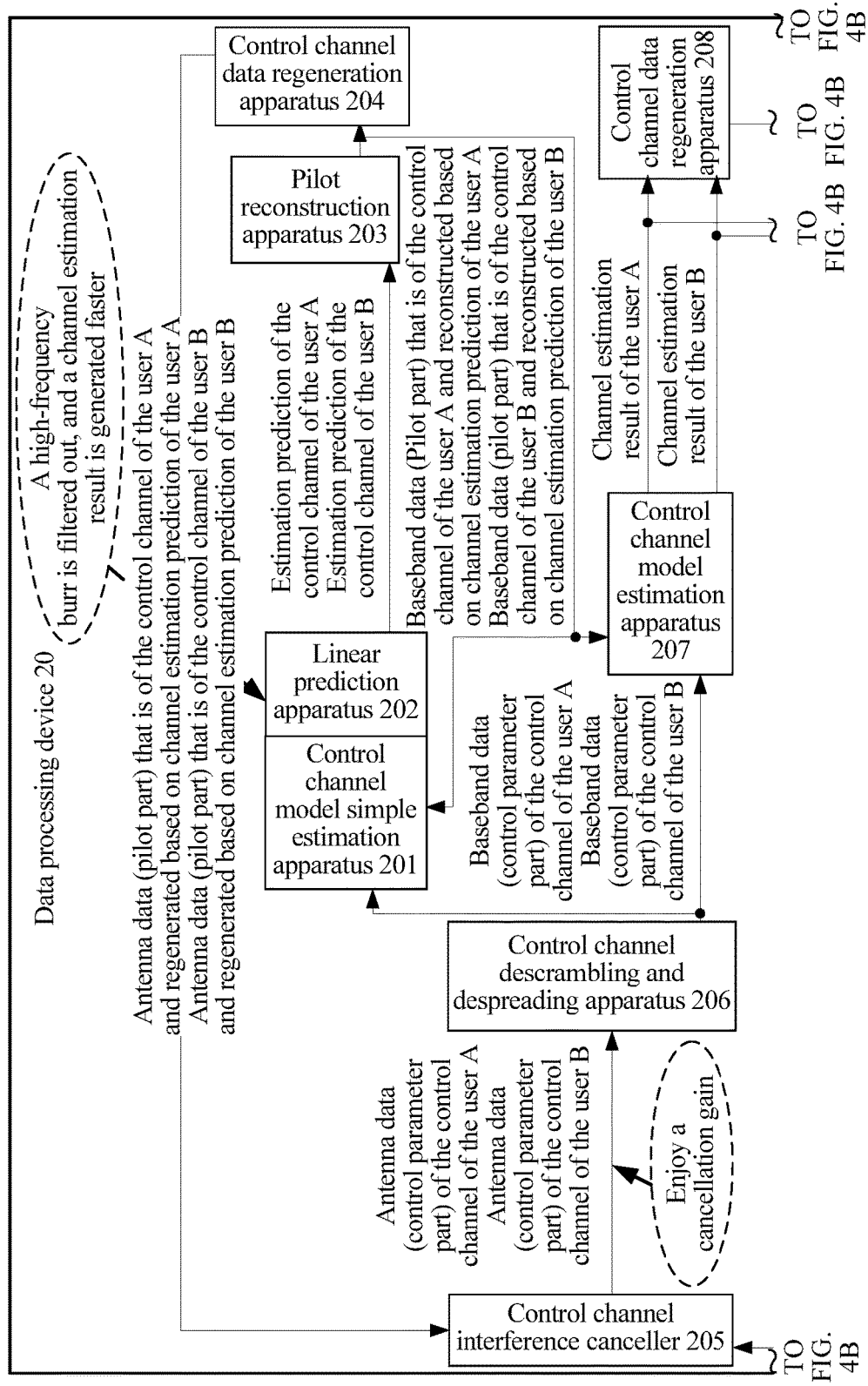
FIG. 4A and FIG. 4B are a schematic structural diagram of a third data processing device according to an embodiment of the present disclosure.
Figure 4B:
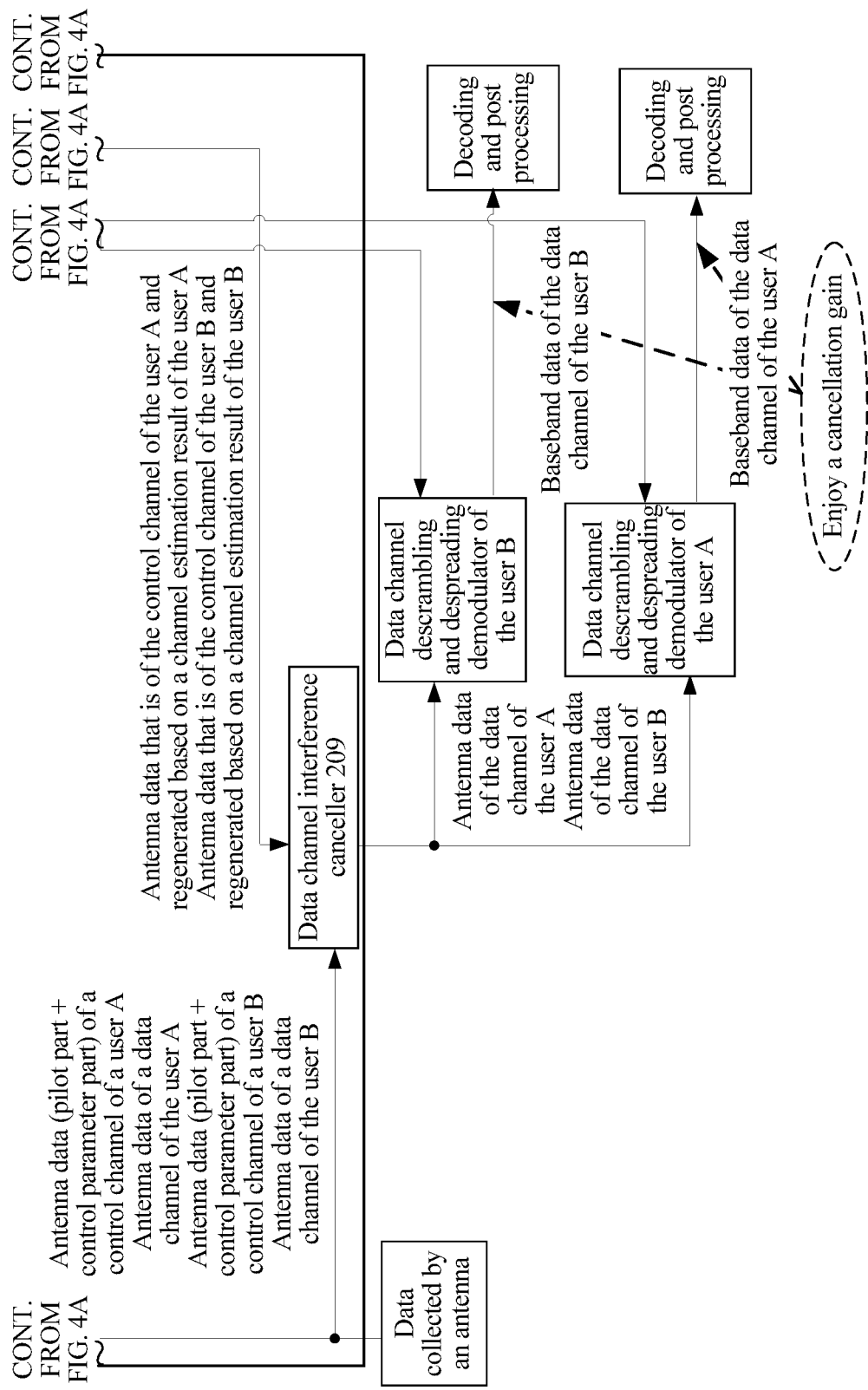

Optionally, as shown in FIG. 4A and FIG. 4B, on the basis of FIG. 2, the data processing device 20 may further include a control channel descrambling and despreading apparatus 206 configured to, in the period n+1, receive the control parameter part in the antenna data of the control channels of the multiple users and output by the control channel interference canceller 205, and for each user of the multiple users, generate a control parameter part in the baseband data of the control channel of the user according to the received control parameter part in the antenna data of the control channel of the user (frequency demodulation).

Optionally, as shown in FIG. 4A and FIG. 4B, the data processing device 20 may further include a control channel model estimation apparatus 207, a control channel data regeneration apparatus 208, and a data channel interference canceller 209, wherein the period n+1, for each user of the multiple users, the data processing device 20 performs the following processing:

1. The control channel model estimation apparatus 207 receives a pilot part, in the baseband data of the control channel of the user, reconstructed by the pilot reconstruction apparatus 203 in the period n and output by the pilot reconstruction apparatus 203, and receives the control parameter part in the baseband data of the control channel of the user from the control channel descrambling and despreading apparatus 206; performs channel estimation of the control channel on the received pilot part in the baseband data of the control channel of the user according to the received control parameter part in the baseband data of the control channel of the user, to obtain a second estimation result of the control channel of the user; and sends the second estimation result to the control channel data regeneration apparatus 208, where the channel estimation includes filtering processing; reference may be made to descriptions in the prior art.

2. The control channel data regeneration apparatus 208 performs control channel data regeneration on the received second estimation result of the control channel of the user, to obtain regenerated antenna data of the control channel of the user; and sends the regenerated antenna data to the data channel interference canceller 209; for a regeneration process, reference may be made to descriptions in the prior art, and details are not described herein again.

The data channel interference canceller 209 removes, in the period n+1 from the antenna data of the multiple users and collected from the antenna, the antenna data of the control channels of the multiple users and received from the control channel data regeneration apparatus 208, to obtain antenna data of data channels of the multiple users.

The control channel model estimation apparatus 207 involves filtering processing, and performs, according to the control parameter part in the baseband data of the control channel and obtained by means of processing by the control channel interference canceller 205, channel model estimation with filtering on the pilot part in the baseband data of the control channel and output by the pilot reconstruction apparatus 203, so that a more accurate channel estimation result can be obtained; regenerated antenna data of the control channel is generated by the control channel data regeneration apparatus 208 using the result; the regenerated antenna data of the control channel is involved in an interference cancellation process of the data channel using the data channel interference canceller, so that the data channel has a better anti-interference effect.

Optionally, the data processing device 20 may further include a data channel descrambling and despreading demodulator configured to, in the period n+1, receive antenna data of the data channels of the multiple users and output by the data channel interference canceller 209, and for each user of the multiple users, process the received antenna data of the data channel of the user according to the second estimation result of the control channel of the user and received from the control channel model estimation apparatus 207, to generate baseband data of the data channel of the user; for a specific processing process, reference may be made to descriptions in the prior art.

Because the second estimation result is obtained by means of channel estimation with filtering processing using the control channel model estimation apparatus 207, the channel estimation result is more accurate, so that a result obtained by means of data channel descrambling, despreading, and demodulation is more accurate.

In the data processing device 20 provided in this embodiment of the present disclosure, the linear prediction performed by the linear prediction apparatus 202 may be Kalman filtering.

Kalman filtering is a recursive optimal estimation method proposed by Kalman in 1958, and is not filtering processing actually, but is a linear prediction method, although being called "filtering".

Kalman filtering uses a state-space description method, and uses a recursive form, which can deal with a multi-dimensional and non-stationary random process. In a case in which a measurement variance is known (generally, a measurement variance of a communications system may be calculated by the communications system in real time, and is used for antenna parameter adjustment and the like), a status of a dynamic system may be estimated by means of Kalman filtering from series of data in which measurement noise exists.

In the data processing device 20, simple estimation is first performed on the baseband data of the control channel, where the simple estimation does not include a filtering process. However, Kalman filtering can be used to correct a result obtained by the simple estimation and not filtered, and can also be used to well remove impact of a high-frequency burr.

Formulas of Kalman filtering are as follows:

$$x(n|n-1)=A*x(n-1|n-1);$$

$$P(n|n-1)=A*P(n-1|n-1)*A^t+Q;$$

$$K(n)=P(n|n-1)/[P(n|n-1)+R];$$

$$x(n|n)=x(n|n-1)+K(n)[y(n)-x(n|n-1)];\text{ and}$$

$$P(n|n)=[1-K(n)]*P(n|n-1),$$

where x(n|n−1) is an optimal value of a first estimation result in the period n and predicted using a first estimation result in the period n−1, x(n−1|n−1) is a first estimation result of the control channel in the period n−1, P(n|n−1) is a covariance matrix of x(n|n−1), P(n−1|n−1) is a covariance matrix of x(n−1|n−1), A is a Kalman filtering transfer coefficient, which is not less than 0 and not greater than 1, t indicates a transpose of a matrix, Q is variance estimation of y(n); K(n) is a Kalman gain, R is an antenna measurement error, y(n) is a result obtained by performing control channel simple estimation on the pilot part in the baseband data of the control channel in the period n, and x(n|n) is a first estimation result in the period n.

Figure 5:
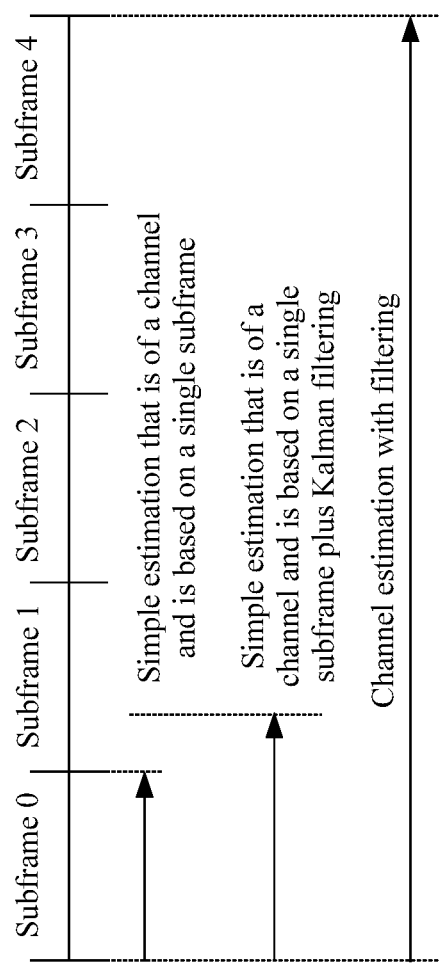
FIG. 5 is a schematic diagram in which channel estimation duration is shortened according to an embodiment of the present disclosure.

FIG. 5 is a schematic diagram of control channel model estimation time. Kalman filtering is used as an example herein, and a subframe is exemplarily used as a unit. As shown in FIG. 5, simple estimation that is of a channel and is based on a single subframe may be completed in one subframe. Simple estimation of a channel and is based on a single subframe plus Kalman filtering may be completed in two subframes. However, for channel estimation with filtering, channel estimation based on multiple subframes needs to be completed in five subframes. It can be seen that, using the data processing device 20 provided in this embodiment of the present disclosure, and by means of simple estimation and linear prediction, duration of channel estimation may be greatly reduced, and a channel estimation result can be obtained earlier.

The foregoing data processing device 20 is implemented using an integrated circuit, and is implemented on one or more semiconductor chips. For example, the integrated circuit may be a digital logic integrated circuit or an analog logic circuit. Each component or unit in the data processing device 20 may include a large quantity of integrated circuits, where the integrated circuits may include a metal-oxide semiconductor (MOS) transistor, a bipolar transistor, a diode, or the like.

Based on a same inventive concept, an embodiment of the present disclosure further provides a data processing method. Because a problem-solving principle of the method is the same as that of the data processing device in the embodiment of the present disclosure, reference may be made to implementation of the data processing device for implementation of the method, and no repeated description is provided.

Figure 6:
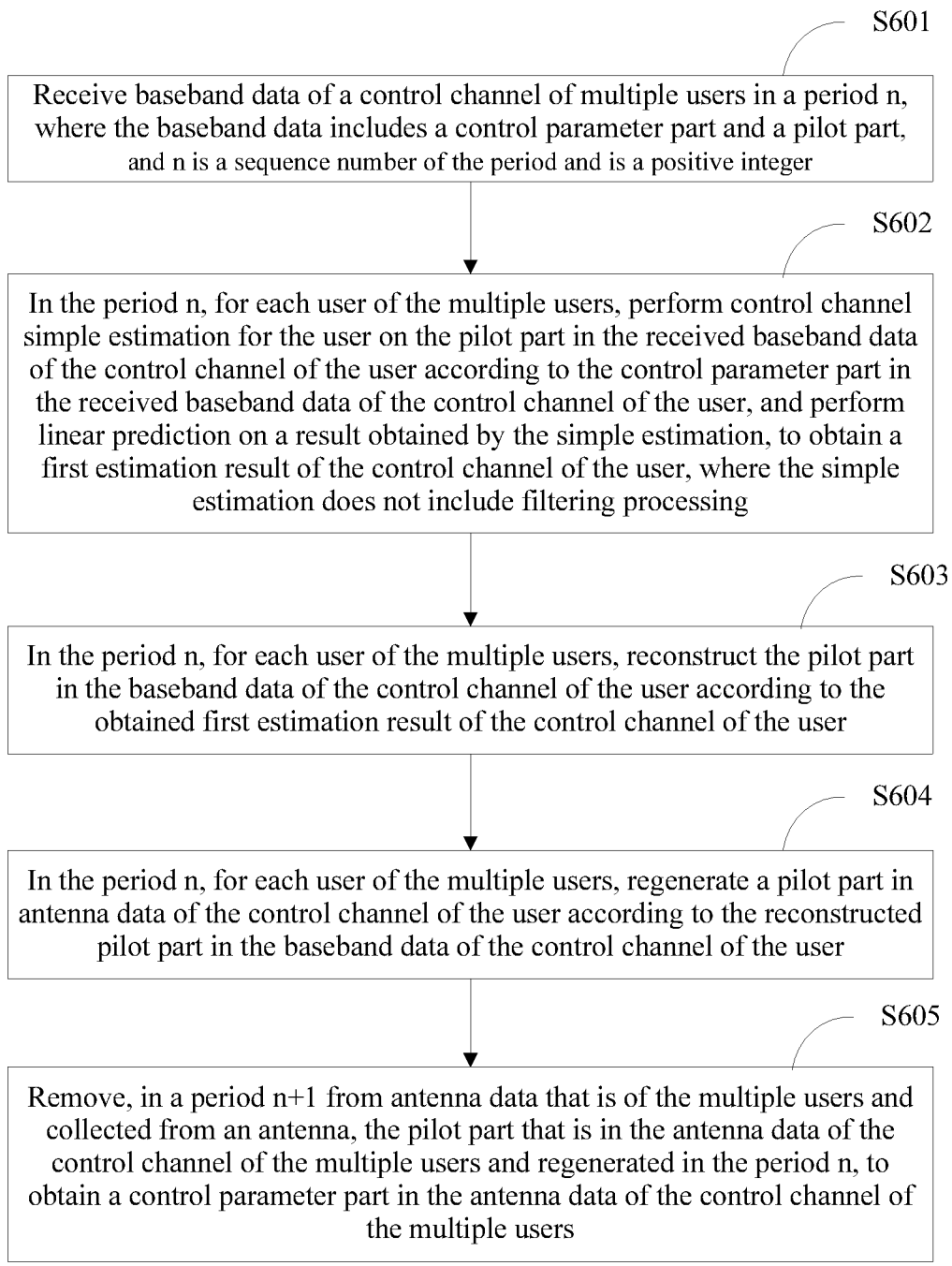
FIG. 6 is a flowchart of a data processing method according to an embodiment of the present disclosure.

FIG. 6 is a flowchart of a data processing method according to an embodiment of the present disclosure. As shown in FIG. 6, the method includes the following steps, Step S601: Receive baseband data of control channels of multiple users in a period n, where the baseband data includes a control parameter part and a pilot part, and n is a sequence number of the period and is a positive integer.

For each user of the multiple users, the following steps are performed in the period n:

Step S602: Perform control channel simple estimation for the user on the pilot part in the received baseband data of the control channel of the user according to the control parameter part in the received baseband data of the control channel of the user, and perform linear prediction on a result obtained by the simple estimation, to obtain a first estimation result of the control channel of the user, where the simple estimation does not include filtering processing.

Step S603: Reconstruct the pilot part in the baseband data of the control channel of the user according to the obtained first estimation result of the control channel of the user.

Step S604: Regenerate a pilot part in antenna data of the control channel of the user according to the reconstructed pilot part in the baseband data of the control channel of the user.

Step S605: Remove, in a period n+1 from antenna data of the multiple users and collected from an antenna, the pilot part in the antenna data of the control channels of the multiple users and regenerated in the period n, to obtain a control parameter part in the antenna data of the control channels of the multiple users.

Optionally, for each user of the multiple users, the pilot part in the baseband data of the control channel of the user and received in the period n is obtained by reconstructing a pilot part in the baseband data of the control channel of the user according to a first estimation result of the control channel of the user and obtained in a period n−1.

Optionally, for each user of the multiple users, the pilot part in the baseband data of the control channel of the user and received in the period n is obtained according to antenna data of the multiple users and collected from the antenna in the period n.

Optionally, after the control parameter part in the antenna data of the control channels of the multiple users is obtained in the period n+1, the method further includes, in the period n+1, for each user of the multiple users, generating a control parameter part in the baseband data of the control channel of the user according to the obtained control parameter part in the antenna data of the control channel of the user.

Optionally, after the control parameter part in the antenna data of the control channels of the multiple users is obtained in the period n+1, the method further includes, in the period n+1, for each user of the multiple users, receiving the pilot part in the baseband data of the control channel of the user and reconstructed in the period n, performing, according to the control parameter part in the baseband data of the control channel of the user and generated in the period n+1, channel estimation of the control channel on the received pilot part in the baseband data of the control channel of the user and reconstructed in the period n, to obtain a second estimation result of the control channel of the user, where the channel estimation includes filtering processing, performing control channel data regeneration on the obtained second estimation result of the control channel of the user, to obtain regenerated antenna data of the control channel of the user, and removing, in the period n+1 from the antenna data of the multiple users and collected from the antenna, the antenna data of the control channels of the multiple users and regenerated in the period n+1 in order to obtain antenna data of data channels of the multiple users.

Optionally, after the antenna data of the data channels of the multiple users is obtained in the period n+1, the method further includes, in the period n+1, for each user of the multiple users, generating baseband data of the data channel of the user according to the obtained second estimation result of the control channel of the user using the obtained antenna data of the data channel of the user.

Optionally, the linear prediction is Kalman filtering.

Optionally, parameter settings of the Kalman filtering are as follows:

$$x(n|n-1)=A*x(n-1|n-1);$$

$$P(n|n-1)=A*P(n-1|n-1)*A^t+Q;$$

$$K(n)=P(n|n-1)/[P(n|n-1)+R];$$

$$x(n|n)=x(n|n-1)+K(n)[y(n)-x(n|n-1)];\text{ and}$$

$$P(n|n)=[1-K(n)]*P(n|n-1),$$

where x(n|n−1) is an optimal value of a first estimation result in the period n and predicted using a first estimation result in the period n−1, x(n−1|n−1) is a first estimation result of the control channel in the period n−1, P(n|n−1) is a covariance matrix of x(n|n−1), P(n−1|n−1) is a covariance matrix of x(n−1|n−1), A is a Kalman filtering transfer coefficient, which is not less than 0 and not greater than 1, t indicates a transpose of a matrix, Q is variance estimation of y(n), K(n) is a Kalman gain, R is an antenna measurement error, y(n) is a result obtained by performing control channel simple estimation on the pilot part in the baseband data of the control channel in the period n, and x(n|n) is a first estimation result in the period n.

In this embodiment of the present disclosure, when channel estimation is performed on a control channel, simple estimation is performed first, and then linear prediction is performed, which replaces the channel estimation that includes the filtering process and performed by the "control channel model estimation apparatus" in FIG. 1, shortens time spent for obtaining a channel estimation result, and can start parallel interference cancellation as early as possible, thereby reducing later interference noise.

In addition to the foregoing hardware implementation scheme, persons skilled in the art should understand that the embodiments of the present disclosure may provide a computer program product to execute the foregoing method. Therefore, the present disclosure may use a form of a computer program product implemented on one or more computer-usable storage media (including but not limited to a disk memory, a compact-disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferential embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A data processing device, comprising:
a control channel model simple estimator;
a linear predictor;
a pilot reconstructor;
a first control channel data regenerator; and
a control channel interference canceller,
wherein the control channel model simple estimator is configured to receive baseband data of control channels of multiple users in a period n,
wherein the baseband data comprises a control parameter part and a pilot part,
wherein n is a sequence number of the period and is a positive integer,
wherein in the period n, for each user of the multiple users the control channel model simple estimator is configured to:
perform control channel simple estimation for the user on the pilot part in the received baseband data of the control channel of the user; and
send a result obtained by the control channel simple estimation to the linear predictor,
wherein the control channel simple estimation is an estimation processing from which filtering processing is excluded,
wherein the linear predictor is configured to:
perform linear prediction on the received result obtained by the control channel simple estimation for the user; and
send an obtained first estimation result of the control channel of the user to the pilot reconstructor,
wherein the pilot reconstructor is configured to:
reconstruct the pilot part in the baseband data of the control channel of the user according to the received first estimation result of the control channel of the user; and
send a reconstructed pilot part to the first control channel data regenerator, wherein the first control channel data regenerator is configured to:
regenerate a pilot part in antenna data of the control channel of the user according to the received pilot part in the baseband data of the control channel of the user; and
send the regenerated pilot part to the control channel interference canceller, and wherein the control channel interference canceller is configured to:
collect antenna data of the multiple users from an antenna in a period n+1;
receive, from the first control channel data regenerator, the regenerated pilot part in the period n; and
remove, from the collected antenna data of the multiple users, the regenerated pilot part in the antenna data of the control channels of the multiple users in order to obtain a control parameter part in the antenna data of the control channels of the multiple users.

2. The device according to claim 1, wherein the pilot part in the baseband data of the control channels of the multiple users and received by the control channel model simple estimator in the period n is from the pilot reconstructor, and wherein the pilot part is reconstructed by the pilot reconstructor in a period n−1.

3. The device according to claim 1, wherein the pilot part in the baseband data of the control channels of the multiple users and received by the control channel model simple estimator in the period n is obtained according to antenna data of the multiple users and collected from the antenna in the period n.

4. The device according to claim 1, wherein the data processing device further comprises a control channel descrambler and despreader configured to:
receive the control parameter part in the antenna data of the control channels of the multiple users and output by the control channel interference canceller in the period n+1; and
generate a control parameter part in the baseband data of the control channel of the user according to the received control parameter part in the antenna data of the control channel of the user for each user of the multiple users.

5. The device according to claim 4, wherein the data processing device further comprises a control channel model estimator, a second control channel data regenerator, and a data channel interference canceller, and wherein in the period n+1, for each user of the multiple users the control channel model estimator is configured to:
receive, from the pilot reconstructor, the pilot part in the baseband data of the control channel of the user and reconstructed by the pilot reconstructor in the period n;
receive the control parameter part in the baseband data of the control channel of the user from the control channel descrambler and despreader;
perform channel estimation of the control channel on the received pilot part in the baseband data of the control channel of the user in order to obtain a second estimation result of the control channel of the user; and send the second estimation result to the second control channel data regenerator, wherein the channel estimation comprises filtering processing, wherein the second control channel data regenerator is configured to:
perform control channel data regeneration on the received second estimation result of the control channel of the user in order to obtain regenerated antenna data of the control channel of the user; and
send the regenerated antenna data to the data channel interference canceller, and wherein the data channel interference canceller is configured to remove, from the antenna data of the multiple users and collected from the antenna in the period n+1, the antenna data of the control channels of the multiple users and received from the second control channel data regenerator in order to obtain antenna data of data channels of the multiple users.

6. The device according to claim 5, further comprising a data channel descrambling and despreading demodulator configured to:
receive antenna data of the data channels of the multiple users and output by the data channel interference canceller in the period n+1; and
process the received antenna data of the data channel of the user according to the second estimation result of the control channel of the user and received from the control channel model estimator for each user of the multiple users in order to generate baseband data of the data channel of the user.

7. The device according to claim 1, wherein the linear prediction is Kalman filtering.

8. The device according to claim 7, wherein parameter settings of the Kalman filtering are as follows:

$$x(n|n-1)=A^*x(n-1|n-1),$$

$$P(n|n-1)=A^*P(n-1|n-1)^*A^t+Q,$$

$$K(n)=P(n|n-1)/[P(n|n-1)+R],$$

$$x(n|n)=x(n|n-1)+K(n)[y(n)-x(n|n-1)], \text{ and}$$

$$P(n|n)=[1-K(n)]^*P(n|n-1),$$

wherein x(n|n−1) is an optimal value of a first estimation result in the period n and predicted using a first estimation result in the period n−1, wherein x(n−1|n−1) is a first estimation result of the control channel in the period n−1, wherein P(n|n−1) is a covariance matrix of x(n|n−1), P(n−1|n−1) is a covariance matrix of x(n−1|n−1), wherein A is a Kalman filtering transfer coefficient of value no greater than 1 and no less than 0, wherein t indicates a transpose of a matrix, wherein Q is variance estimation of y(n), wherein K(n) is a Kalman gain, wherein R is an antenna measurement error, wherein y(n) is a result obtained by performing control channel simple estimation on the pilot part in the baseband data of the control channel in the period n, and wherein x(n|n) is a first estimation result in the period n.

9. A data processing method, comprising:
receiving baseband data of control channels of multiple users in a period n, wherein the baseband data comprises a control parameter part and a pilot part, wherein n is a sequence number of the period and is a positive integer, and wherein for each user of the multiple users, separately performing the following operations in the period n:
performing control channel simple estimation for the user on the pilot part in the received baseband data of the control channel of the user;
performing linear prediction on a result obtained by the control channel simple estimation in order to obtain a first estimation result of the control channel of the user, wherein the control channel simple estimation is an estimation processing from which filtering processing is excluded;
reconstructing the pilot part in the baseband data of the control channel of the user according to the obtained first estimation result of the control channel of the user;
regenerating a pilot part in antenna data of the control channel of the user according to the reconstructed pilot part in the baseband data of the control channel of the user; and
removing, from the antenna data of the multiple users and collected from an antenna in a period n+1, the pilot part in the antenna data of the control channels of the multiple users and regenerated in the period n in order to obtain a control parameter part in the antenna data of the control channels of the multiple users.

10. The method according to claim 9, wherein for each user of the multiple users, the pilot part in the baseband data of the control channel of the user and received in the period n is obtained by reconstructing the pilot part in the baseband data of the control channel of the user according to the first estimation result of the control channel of the user and obtained in a period n−1.

11. The method according to claim 9, wherein for each user of the multiple users, the pilot part in the baseband data of the control channel of the user and received in the period n is obtained according to antenna data of the multiple users and collected from the antenna in the period n.

12. The method according to claim 9, wherein after the control parameter part in the antenna data of the control channels of the multiple users is obtained in the period n+1, the method further comprises generating a control parameter part in the baseband data of the control channel of the user according to the obtained control parameter part in the antenna data of the control channel of the user for each user of the multiple users in the period n+1.

13. The method according to claim 12, wherein after the control parameter part in the antenna data of the control channels of the multiple users is obtained in the period n+1, and wherein in the period n+1, for each user of the multiple users, the method further comprises:
receiving the pilot part in the baseband data of the control channel of the user and reconstructed in the period n;
performing channel estimation of the control channel on the received pilot part in the baseband data of the control channel of the user and reconstructed in the period n in order to obtain a second estimation result of the control channel of the user, wherein the channel estimation comprises filtering processing;
performing control channel data regeneration on the obtained second estimation result of the control channel of the user in order to obtain regenerated antenna data of the control channel of the user; and removing, from the antenna data of the multiple users and collected from the antenna in the period n+1, the antenna data of the control channels of the multiple users and regenerated in the period n+1 in order to obtain antenna data of data channels of the multiple users.

14. The method according to claim 13, wherein after the antenna data of the data channels of the multiple users is obtained in the period n+1, the method further comprises generating baseband data of the data channel of the user according to the obtained second estimation result of the control channel of the user using the obtained antenna data of the data channel of the user in the period n+1, for each user of the multiple users.

15. The method according to claim 9, wherein the linear prediction is Kalman filtering.

16. The method according to claim 15, wherein parameter settings of the Kalman filtering are as follows:

$$x(n|n-1)=A*x(n-1|n-1),$$

$$P(n|n-1)=A*P(n-1|n-1)*A^t+Q,$$

$$K(n)=P(n|n-1)/[P(n|n-1)+R],$$

$$x(n|n)=x(n|n-1)+K(n)[y(n)-x(n|n-1)],$$

$$P(n|n)=[1-K(n)]*P(n|n-1),$$

wherein x(n|n−1) is an optimal value of a first estimation result in the period n and predicted using a first estimation result in the period n−1,
wherein x(n−1|n−1) is a first estimation result of the control channel in the period n−1,
wherein P(n|n−1) is a covariance matrix of x(n|n−1),
wherein P(n−1|n−1) is a covariance matrix of x(n−1|n−1),
wherein A is a Kalman filtering transfer coefficient of value no less than 0 and no greater than 1,
wherein t indicates a transpose of a matrix,
wherein Q is variance estimation of y(n),
wherein K(n) is a Kalman gain,
wherein R is an antenna measurement error,
wherein y(n) is a result obtained by performing control channel simple estimation on the pilot part in the baseband data of the control channel in the period n, and
wherein x(n|n) is a first estimation result in the period n.

17. A data processing device, comprising:
a memory storing executable instructions; and
a processor coupled to the memory and configured to:
receive baseband data of control channels of multiple users in a period n, wherein the baseband data comprises a control parameter part and a pilot part, wherein n is a sequence number of the period and is a positive integer, wherein in the period n, for each user of the multiple users the processor is further configured to perform control channel simple estimation for the user on the pilot part in the received baseband data of the control channel of the user, and wherein the control channel simple estimation is an estimation processing from which filtering processing is excluded;
perform linear prediction on the result obtained by the control channel simple estimation for the user in order to obtain a first estimation result of the control channel of the user
reconstruct the pilot part in the baseband data of the control channel of the user according to the first estimation result of the control channel of the user;
regenerate a pilot part in antenna data of the control channel of the user according to the received pilot part in the baseband data of the control channel of the user;
collect antenna data of the multiple users from an antenna in a period n+1; and
remove, from the collected antenna data of the multiple users, the regenerated pilot part in the antenna data of the control channels of the multiple users in order to obtain a control parameter part in the antenna data of the control channels of the multiple users.

18. The device according to claim 17, wherein the pilot part in the baseband data of the control channels of the multiple users is received in the period n, and wherein the pilot part is reconstructed in a period n−1.

19. The device according to claim 17, wherein the pilot part in the baseband data of the control channels of the multiple users received in the period n is obtained according to antenna data of the multiple users and collected from the antenna in the period n.

20. The device according to claim 17, wherein the processor is further configured to:
receive the control parameter part in the antenna data of the control channels of the multiple users and output in the period n+1; and
generate a control parameter part in the baseband data of the control channel of the user according to the received control parameter part in the antenna data of the control channel of the user for each user of the multiple users.

* * * * *